United States Patent
Ficht

(10) Patent No.: US 9,410,623 B2
(45) Date of Patent: Aug. 9, 2016

(54) SEAL ARRANGEMENT FOR A PISTON ROD

(75) Inventor: Reinhold Ficht, Kirchseeon (DE)

(73) Assignee: Bertwin R. Geist, Eurasburg (DE)

( * ) Notice: Subject to any disclaimer, the term of this patent is extended or adjusted under 35 U.S.C. 154(b) by 398 days.

(21) Appl. No.: 13/990,875

(22) PCT Filed: Sep. 21, 2011

(86) PCT No.: PCT/EP2011/066466
§ 371 (c)(1),
(2), (4) Date: Jul. 24, 2013

(87) PCT Pub. No.: WO2012/072295
PCT Pub. Date: Jun. 7, 2012

(65) Prior Publication Data
US 2013/0291716 A1    Nov. 7, 2013

(30) Foreign Application Priority Data
Dec. 2, 2010 (DE) .......................... 10 2010 053 271

(51) Int. Cl.
| | |
|---|---|
| *F16J 15/18* | (2006.01) |
| *F16J 1/00* | (2006.01) |
| *F16J 15/00* | (2006.01) |
| *F16J 15/28* | (2006.01) |
| *F16J 15/56* | (2006.01) |

(52) U.S. Cl.
CPC *F16J 1/00* (2013.01); *F16J 15/004* (2013.01); *F16J 15/28* (2013.01); *F16J 15/56* (2013.01)

(58) Field of Classification Search
CPC ........ F04B 39/041; F16J 15/28; F16J 15/004; F16J 15/56; F16J 15/16; F16J 15/022; F01B 9/023
USPC ........................................................ 277/514
See application file for complete search history.

(56) References Cited

U.S. PATENT DOCUMENTS

| | | | | |
|---|---|---|---|---|
| 1,788,496 | A * | 1/1931 | Smith ...................... | F16J 15/28 277/511 |
| 3,076,659 | A * | 2/1963 | Kremer, Jr. .............. | F16J 15/28 277/543 |
| 3,124,502 | A * | 3/1964 | Radke ...................... | F16J 15/20 277/536 |
| 3,490,774 | A * | 1/1970 | Henry .................... | F04B 39/041 277/543 |
| 3,658,348 | A * | 4/1972 | Nink ........................ | F16J 15/56 277/500 |
| 3,871,668 | A | 3/1975 | Coker et al. | |

(Continued)

FOREIGN PATENT DOCUMENTS

| | | | |
|---|---|---|---|
| AT | 508131 A4 | 11/2010 | |
| BE | FR 395855 A * | 3/1909 | ............... F16J 15/28 |

(Continued)

*Primary Examiner* — Nathaniel Wiehe
*Assistant Examiner* — Daniel Collins

(57) ABSTRACT

The invention relates to an arrangement for sealing off a piston rod, which moves substantially rectilinearly in a reciprocating manner with respect to a passage opening, of a reciprocating-piston machine, having at least two internally clamping sealing rings, which surround the piston rod and are arranged in the region of the passage opening so as to be substantially fixed with respect to a seal housing, and are mounted in the seal housing so as to be movable in a radial direction, and between at least two seal rings there is arranged a spacer ring which is arranged spaced apart from the piston rod, so as to form, together with the seal rings and the piston rod, an accumulation chamber for medium to be sealed off, for example for oil, and the spacer ring has at least one passage for discharging medium out of the accumulation chamber.

25 Claims, 5 Drawing Sheets

(56) References Cited

U.S. PATENT DOCUMENTS 4,093,239 A * 6/1978 Sugahara ............... F02F 11/00 277/514
2012/0211945 A1 * 8/2012 Lindner-Silwester ............ F04B 39/0094 277/508

FOREIGN PATENT DOCUMENTS

| CH | 93880 A | 5/1922 |
| DE | 1144873 B | 3/1963 |
| DE | 3218255 A1 | 11/1983 |
| FR | 691926 A | 10/1930 |

* cited by examiner

SEAL ARRANGEMENT FOR A PISTON ROD

FIELD OF THE INVENTION

The invention relates to an arrangement for sealing a piston rod, which reciprocates essentially in a straight line, in a reciprocating piston machine.

BACKGROUND OF THE INVENTION

A seal arrangement which defines the species is known, for example, from DE 32 18 255 A1. A seal arrangement of this kind is provided for operation in a so-called Scotch yoke engine, which is characterized among other things by the fact that piston rods between the working piston and the crank mechanism move only in a straight line along their longitudinal axes. In such engines, the crankcase is usually separated from the cylinder chambers by a partition wall and the piston rod passes through this partition wall in the region of a through opening.

Particularly in two-stroke internal combustion engines, this opens up the possibility of using a cylinder chamber between the partition wall and the piston, which chamber is sealed on the side oriented toward the crankcase, as an option for supercharging the engine, i.e. using this chamber as a charging pump for supercharging the engine.

The reference cited above proposes guiding the piston rod in the radial direction by means of a guide sleeve in the region of the partition wall opening, thereby providing it with a definite support. A single sealing ring is proposed, which is embodied in the form of an internally clamping sealing ring and is seated in a ring element. With regard to the through opening, the sealing ring is situated on the cylinder side of the Scotch yoke engine so that the guide sleeve supporting the piston rod in the radial direction can also be supplied with oil from the crankcase. This seal has in fact proven its worth. It has particularly proven its worth for use in gasoline or diesel engines. It has not always been able, however, to completely prevent oil from escaping from the crankcase into the cylinder chamber since the one sealing ring proposed must not only produce a seal preventing gas pressures from the cylinder chamber from escaping in the direction of the crankcase, but must also perform the function of stripping off oil that has been carried out of the crankcase and through the guide sleeve by the piston rod.

The object of the invention, therefore, is to propose an arrangement for sealing reciprocating piston machine piston rods that extend through partition walls, that is particularly suitable for use in high-speed reciprocating piston machines, in particular engines and compressors of the Scotch yoke type, which prevents to the greatest extent possible the escape of oil from the crankcase into a cylinder chamber on the one hand and prevents to the greatest extent possible losses in gas pressure from a cylinder chamber, which is delimited for example by the piston bottom and a partition wall of the reciprocating piston machine, and to provide a further optimized sealing action. In particular, it is also important for this seal to be embodied in a simple way, with a small number of separate parts. In particular, it should be easily possible to replace the sealing rings that produce the sealing action. Particular focus should be placed on the possibility of preassembling the seal arrangement in modular fashion.

Furthermore, the invention should in particular be suitable for use in high-speed engines in which the maximum piston velocity of approximately 20 to 26 m/sec can occur, which likewise corresponds to the maximum piston rod velocity. In particular, a seal arrangement should be proposed, which is suitable for reciprocating piston machines that are preferably embodied as gasoline engines, preferably used in stationary operation, i.e. with engine speeds that change only slightly in long-term operation.

SUMMARY OF THE INVENTION

The invention is based on an arrangement for sealing a piston rod of a reciprocating piston machine, which reciprocates essentially in a straight line relative to a through opening, in which the piston rod is enclosed by sealing means embodied in the form of an internally clamping sealing ring. The sealing ring is situated in the region of the through opening and is essentially stationary relative to a seal housing. The expression "essentially stationary" should be understood here to mean that the sealing ring is supported so that it is stationary, i.e. is supported without play or with a small amount of play, in an axial direction, i.e. a longitudinal direction of the piston rod, and so that it floats in a radial direction relative to the piston rod, i.e. in particular perpendicular to the axial direction, so that the sealing ring is able to move along with any movements of the piston rod occurring in this radial direction. Such movements in the radial direction of the piston rod, in purely kinematic terms, theoretically do not occur in a Scotch yoke mechanism, but in actual practice, these radial movements do occur in small dimensions of a few $1/100$ mm and/or at most a few $1/10$ mm during operation of the reciprocating piston machine. As a result, dynamic forces in the crank mechanism can induce oscillations or deflections of the piston rod due to the explosive action on the piston, which results in a slight radial deflection of regions of the piston rods. Based on this, the invention includes the modification that the sealing rings are supported in the seal housing so that they can move, in particular float, in the radial direction. By comparison with the prior art, the invention proposes providing a plurality of such as sealing rings, i.e. at least two of them. Between at least two sealing rings, a spacer element is provided, which is externally guided without play or with only a slight amount of play in the seal housing and on the radial inside oriented toward the piston rod, has an amount of play in the radial direction that is greater than the external play. This achieves the fact that the spacer element is guided only in the seal housing and maintains a radial distance from the piston rod and does not touch it in any operating state.

The spacer element is preferably embodied in the form of a spacer ring and with the sealing rings and a subregion on the outside of the piston rod, forms a retention chamber in which medium to be sealed, e.g. oil from the crankcase of the reciprocating piston machine, can be collected. To permit potentially collected medium, e.g. oil, to be conveyed out of the retention chamber, the spacer ring has at least one passage to permit medium to be discharged from the retention chamber into a surrounding region.

The invention therefore makes it possible in particular to simply embody the internally clamping sealing ring in terms of its geometric design. For example, a cross-sectionally rectangular sealing ring is sufficient. According to the invention, conduits that are required for conveying medium—which has been stripped off and is to be sealed off—out of the retention chamber are provided in the spacer element, which is not intrinsically required to fulfill any sealing function relative to the piston rod.

Preferably, the use of a plurality of sealing rings and a plurality of spacer elements, which are preferably embodied in the form of spacer rings, produces a plurality of retention chambers, i.e. at least two of them.

According to a particular embodiment, the seal housing is equipped with means for conveying away medium that comes out of the retention chamber. These means can be conduits provided in the seal housing, which are connected for example to a suction pump; the suction pump can suck medium from the seal housing and thus indirectly from the retention chambers.

According to a particular embodiment of the invention, at least two sealing rings and at least one spacer ring constitute a seal packet, which is supported in the seal housing without play or virtually without play in the axial direction, i.e. in the movement direction of the piston rod. In this case, at least the sealing rings are supported in a radially floating fashion so that they can absorb any slight deflections of the piston rod in the radial direction in that the piston rings move along with these deflections. The seal packet can be prestressed in the axial direction so that neither the sealing rings nor the spacers are able to execute a movement in the axial direction. The prestressing is selected so as to ensure the above-mentioned radial mobility (floating support) of the sealing rings. A particularly suitable way to achieve this, for example, is to use an axially acting lock washer, which keeps the seal packet prestressed without play inside the seal housing.

The invention makes it possible to embody the sealing rings with a particularly simple cross-sectional geometry, e.g. rectangular, and in particular to embody them in the form of one-piece, internally clamping resilient sealing rings; only a single butt joint is provided to permit the sealing ring to expand slightly. During operation, the sealing ring is supported in a prestressed, resilient fashion on the outside of the piston rod.

In order to increase the sealing action, the butt joint is embodied in the form of a bevel cut through the sealing ring so that when the sealing ring is loaded in the axial direction, the free ends of the sealing ring in the vicinity of the butt joint rest flat against each other, thus effectively sealing the butt joint.

It has turned out to be particularly preferable for the bevel cut to be oriented at an angle $\alpha$ of 10° to 45°, in particular 10° to 30°, relative to the plane of the sealing ring in order to achieve a particularly large overlap region of the free ends of the sealing ring.

With the small dimensions of the sealing rings and spacer rings according to the invention, it has proven useful to produce the bevel cut for the butt joint of the sealing ring by means of a laser cut. Such a cut has a particularly narrow width of cut so that in the event of axial compression or axial prestressing forces on such a sealing ring, the opposing cut surfaces come to rest against each other, sealing the cut joint in a particularly effective way.

The arrangement according the invention is particularly well-suited for embodying a small seal arrangement; in particular, the sealing rings have a thickness $d_D$ of 1 mm to 1.8 mm, particularly preferably, a thickness $d_D$ of 0.85 mm to 1.8 mm, and ideally, a thickness $d_D$ of 0.95 mm to 1.3 mm Naturally, with particularly thick piston rods, it may be necessary to slightly exceed the values for the thickness of the sealing rings. The above-mentioned dimensions have proven their worth particularly with piston rod diameters of between 15 mm and 30 mm, which are predominantly used in high-speed reciprocating piston machines.

Preferably, the spacer rings are embodied as essentially H-shaped in cross-section, with external struts, which are depicted vertically in the drawing, embodied for contact with the axial end surfaces of sealing rings, thus providing a large contact area for guiding the sealing rings, particularly during the radially oscillating deflection of the sealing rings.

In one embodiment of the spacer rings, the crosspiece of the essentially H-shaped cross-section of the spacer rings has passages that are in particular embodied in the form of bores, which preferably extend in the radial direction and produce a connection between the retention chamber and the external surroundings in the seal housing for the medium that has been stripped and collected in the retention chamber.

It is naturally also suitable to provide a plurality of bores in the spacer rings, distributed radially over their circumferences.

Preferably, the spacer rings have a crenellated contour at their outer circumference so that through conduits between the seal housing and the spacer rings are formed that communicate with one another in the axial direction. This ensures that for the suction of stripped-off medium out of a plurality of retention chambers, this medium is conveyed into a collecting chamber situated between the seal housing and the spacer rings, from which preferably a single suction line cooperating with a suction pump can drain the stripped-off medium.

In another embodiment of the spacer rings, they can also—like the sealing rings—be embodied as rectangular in cross-section and on their end surfaces oriented toward the sealing rings, can have conduits in the form of grooves or other channel-like recesses extending essentially radially outward on their end surfaces oriented toward the sealing rings. This embodiment also ensures that medium, which has been stripped off in the retention chamber or is present there, can travel outward into the collecting chamber of the seal housing via these channels/grooves.

For the spacer rings, particularly with the above-mentioned thicknesses of piston rods, dimensions for the thickness $d_A$ that lie in the range from 2.5 mm to 4 mm, in particular from 2.5 mm to 3.5 mm have proven suitable. Such a selection of the thickness $d_A$ of the spacer rings and the above-mentioned thickness $d_D$ of the sealing rings makes it possible to produce particularly compact seal packets with surprisingly high-quality sealing action, which have a particularly short axial length that is particularly advantageous in small engines/compressors.

For the total axial play of the seal packet or seal packets in the seal housing, a dimension of approximately 0.05 mm to 0.15 mm, in particular 0.05 mm to 0.1 mm has proven suitable. The more seal packets are used, the greater the selected maximum total axial play should be within the range between the above-mentioned limits.

In addition to providing seal packets, instead of or in addition to the spacer rings, a bearing bush can be inserted between two additional sealing rings, which provides or contributes to the radial support of the piston rod in the region of the through opening.

The seal housing can be suitably closed by means of a seal housing cover and in particular, can be fastened along with this cover to a partition wall of the reciprocating piston machine. This makes it possible to successfully preassemble a seal arrangement according to the invention in modular fashion and to embody it so that it can be inserted as a unit into a reciprocating piston machine. In particular, this reduces the amount of effort required for assembly, where it should be particularly noted that a handling of smaller parts such as the sealing rings and spacer rings can conveniently occur outside the reciprocating piston machine. This efficiently avoids errors or inaccuracies during installation.

In particular, a reciprocating piston machine according to the invention has a crank mechanism in the form of a Scotch yoke with a piston rod, which reciprocates in essentially linear fashion and in a straight line, and has a partition wall for separating the crankcase from a cylinder chamber situated between the partition wall and a piston bottom. The through opening for the piston rod is provided in the region of this partition wall and is sealed by means of the seal arrangement according to the invention.

In a preferred embodiment, the reciprocating piston machine according to the invention is embodied in the form of an internal combustion engine, in particular operated in accordance with the two-stroke principle; naturally, however, such a reciprocating piston machine can also be operated in accordance with the four-stroke principle.

In a particular embodiment, the reciprocating piston machine is embodied in the form of a gasoline engine.

Likewise, the reciprocating piston machine can also be embodied in the form of an externally driven subassembly, for example as a compressor.

The invention will be explained in greater detail below by way of example in conjunction with the drawings.

DETAILED DESCRIPTION OF THE PREFERRED EMBODIMENTS

Figure 7:
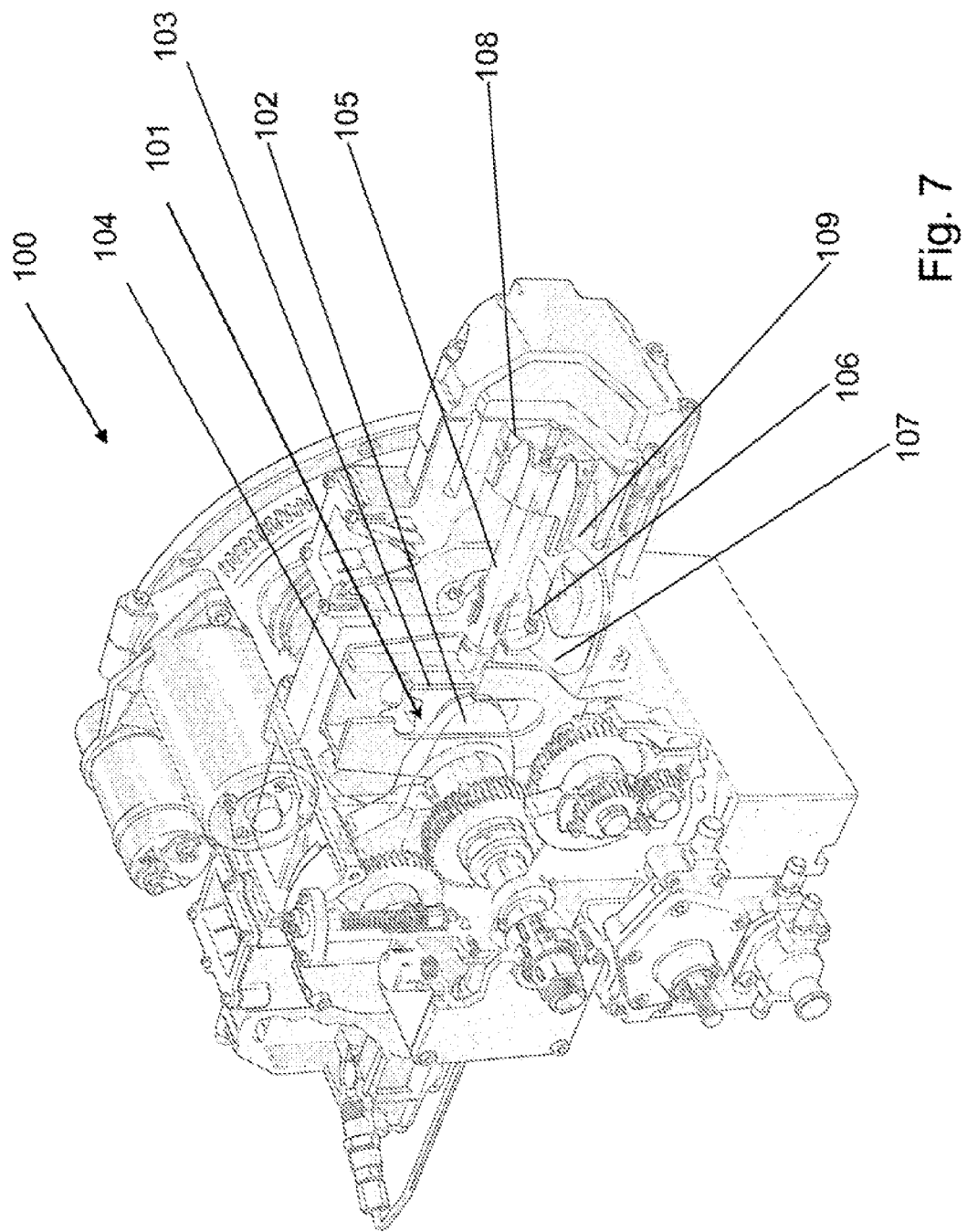
FIG. 7: is a partially sectional, isometric view of a reciprocating piston machine equipped with a seal arrangement according to DE 32 18 225 A1 (prior art).

FIG. 7 is a partially sectional, isometric view of a reciprocating piston machine according to the prior art, equipped with a prior-art seal arrangement according to DE 32 18 225 A1. The brief description of this figure below is intended to explain the technical background of the seal arrangement according to the invention and to illustrate the use of the seal arrangement in a reciprocating piston machine.

A reciprocating piston machine 100 (FIG. 7) has a crank mechanism 101. The crank mechanism 101 has a crank shaft 102 whose crank pin supports a sliding block 103. The sliding block 103 rests with its sliding surfaces in a Scotch yoke mechanism 104 and slides against corresponding counterpart sliding surfaces therein. The Scotch yoke mechanism 104 is mechanically connected to at least one piston rod 105; in the exemplary embodiment, it is connected to two of them. The piston rod 105 is guided in the longitudinal direction of the piston rod 105 by means of a partition wall bearing 106. The partition wall bearing 106 is supported in a partition wall 107 of the reciprocating piston machine 100; the partition wall 107 separates a crankcase chamber containing the crank mechanism (sliding block, crankshaft, Scotch yoke mechanism) from a cylinder chamber underneath a piston 108, sealing this cylinder chamber in relation to the crankcase. In an embodiment of the reciprocating piston machine as an internal combustion engine operated in accordance with the two-stroke principle, this cylinder chamber underneath the piston 108, which is delimited by the partition wall and a cylinder body 109, can be operated as a charging pump; the reciprocating piston 108 can pump fresh air/fuel mixture into a combustion chamber from the cylinder chamber between the partition wall bearing 106 and the piston 108. In the prior art, the partition wall bearing 106 must on the one hand perform the task of sealing the crankcase in relation to the chamber between the partition wall 107 and piston 108, to a certain degree in a fluid-tight and gas-tight fashion. On the other hand, the partition wall bearing 106 according to the prior art must perform the task of guiding the piston rods 105 in movable fashion in their longitudinal direction while simultaneously fixing them in the radial direction 3b.

The invention described below involves a seal arrangement for sealing the axially reciprocating piston rod 105 in the region of the partition wall 107 of such a reciprocating piston machine 100.

Figure 1:
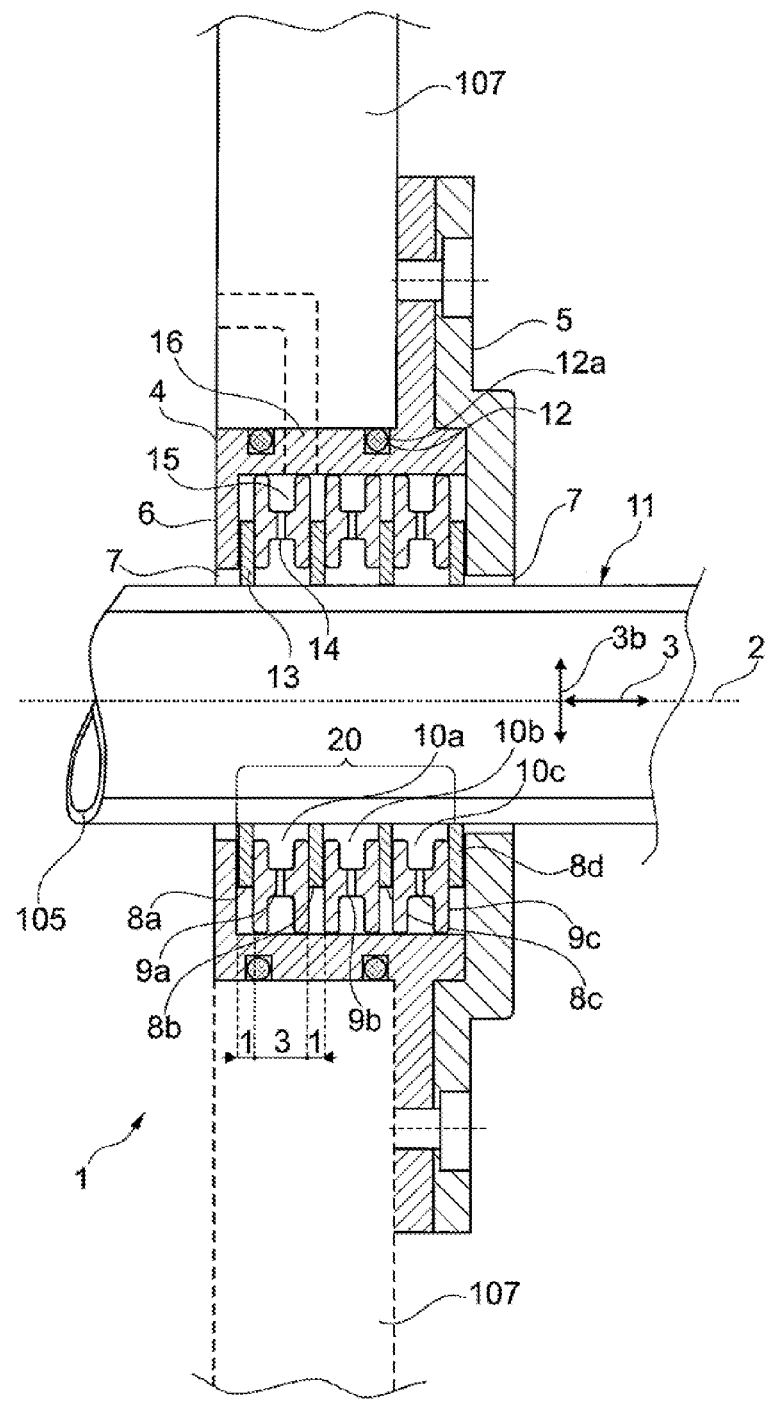
FIG. 1: is a cross-sectional depiction of a first embodiment of the seal arrangement according to the invention.

FIG. 1 schematically depicts a seal arrangement 1 according to the invention in a longitudinal section along a longitudinal axis 2 of a piston rod 105. The piston rod 105 moves in the direction of the longitudinal axis 2 during operation of a reciprocating piston machine 100, axially oscillating in the direction of the double arrow 3. The seal arrangement 1 according to the invention has a first seal housing part 4 and a second seal housing part 5; the first seal housing part 4 is embodied in the form of a seal basket that contains seals while the second seal housing part 5 is embodied in the form of a seal housing cover. The first seal housing part 4 has a housing bottom 6, which has an opening through which the piston rod 105 extends.

Starting from the housing bottom 6, the exemplary embodiment according to FIG. 1 has a total of four sealing rings 8a, 8b, 8c, 8d. The first sealing ring 8a rests against the housing bottom 6 in the axial direction (double arrow direction 3). A first spacer element 9a is situated between the first sealing ring 8a and the second sealing ring 8b. Spacer elements 9b and 9c are also respectively situated between the second sealing ring 8b and third sealing ring 8c and between the third sealing ring 8c and fourth sealing ring 8d. The respective pairs of sealing rings 8a and 8b, 8b and 8c, 8c and 8d, together with the respective spacer elements 9a, 9b, 9c situated between them, form annular retention chambers 10a, 10b, 10c, which in addition to the involved sealing rings and the involved spacer elements, are delimited by an outer surface 11 of the piston rod 105. In the graphic depiction in FIG. 1, the region to the left of the first seal housing part 4 belongs to the reciprocating piston machine 100 while the region to the right of the second seal housing part 5 in the drawing in FIG. 1 belongs to the chamber underneath the piston, which chamber can be used as a charging pump. In order to illustrate the installation situation, a partition wall 107 is a schematically depicted.

The seal housing part 4 has a circumferential grooves 12 on the outside in which O-rings 12a, for example, are supported, which in the assembled state, seal the first seal housing part 4 in relation to the partition wall 107.

The sealing rings 8a, 8b, 8c, 8d are embodied in the form of so-called internally clamping sealing rings and rest with their sealing edges 13 in a prestressed fashion against the outer surface 11 of the piston rod 105. The sealing rings 8a, 8b, 8c, 8d are inserted into the first seal housing part 4 with a large amount of play in a radial direction 3b that extends perpendicular to the axial direction 3. As a result, the radial guidance of the sealing rings 8a, 8b, 8c, 8d is provided exclusively by the outer surface 11 of the piston rod 105.

The spacer elements 9a, 9b, 9c are supported in the seal housing part 4 guided by their outsides in the radial direction 3b and are spaced apart from the outer surface 11 of the piston rod 105 by a distance that is at least large enough to prevent the spacer elements from touching the outer surface 11 of the piston rod in any conceivable operating situation. The spacer elements 9a, 9b, 9c are in particular embodied in the form of spacer rings 9a, 9b, 9c, which will be described in greater detail further below.

Characteristic features for the spacer rings/spacer elements 9a, 9b, 9c include the fact that they have at least one passage 14 via which the retention chambers 10a, 10b, 10c communicate with an outer chamber 15 situated outside the retention chambers 10a, 10b, 10c. Medium such as oil that is contained in the retention chambers 10a, 10b, 10c and has traveled past one or more sealing rings 8a, 8b, 8c, 8d can be collected and drained into the outer chamber 15 via the passage 14. The outer chamber 15 communicates via a drainage line 16 for example with a suction pump (not shown) that can suck medium, which has been stripped off and separated, e.g. lubricating oil, out of the outer chamber 15.

On the piston side, the seal arrangement 1 according to the invention has a second seal housing part in the form of a cover 5, which covers the housing part 4 and likewise has an opening 7 through which the piston rod 105 extends.

The housing cover (seal housing part 5) here is embodied so that a seal packet 20 composed of one out of at least two, but preferably several, sealing rings 8a, 8b, 8c, 8d and the corresponding spacer elements 9a, 9b, 9c provided is secured without play or virtually without play in the seal housing composed of the seal housing parts 4 and 5. In the following, the seal packet 20, which is composed of at least two sealing rings 8a, 8b and at least one spacer ring 9a, is referred to for the sake of simplicity by the reference numeral 20. In a particularly preferred embodiment, a wavy lock washer (not shown) can be provided, which is positioned so that it surrounds the piston rod 105, for example between a sealing ring 8b and the second seal housing part and prestresses the seal packet 20 in the axial direction 3.

The seal housing 4, 5 can also be embodied in a way that selects tolerances of the seal housing parts 4 and 5 relative to each other such that a seal packet 20 is fixed without play or virtually without play in the axial direction 3. A dimension for the total play of a seal packet 20 inside the seal housing 4, 5 of 0.05 mm to 0.15 mm, in particular 0.05 mm to 0.1 mm has proven suitable in actual practice. Such a play-encumbered support of the seal packet 20 in the housing is acceptable since this does not negatively influence the sealing properties of the seal arrangement 1 according to the invention. In addition to such a play-encumbered arrangement of the seal packet 20 in the seal housing 4, 5, it is also possible to select a play-free or even slightly prestressed arrangement. In a prestressed installation situation of the seal packet 20 in the seal housing 4, 5, care must be taken that the sealing rings 8a, 8b, 8c, 8d are able to move along with slight radial movements of the piston rod 105, which experience has shown to lie in the range of a few $1/10$ mm, thus preventing an expansion of the sealing rings. It is thus possible to ensure that the piston rod 105 is securely sealed in every operating situation.

Figure 2:
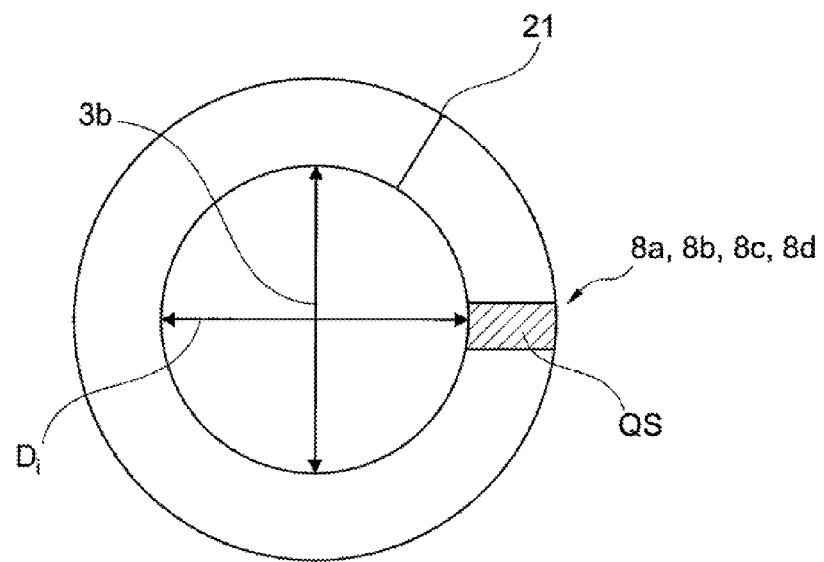
FIG. 2: is a top view of a sealing ring according to the invention.
Figure 3:
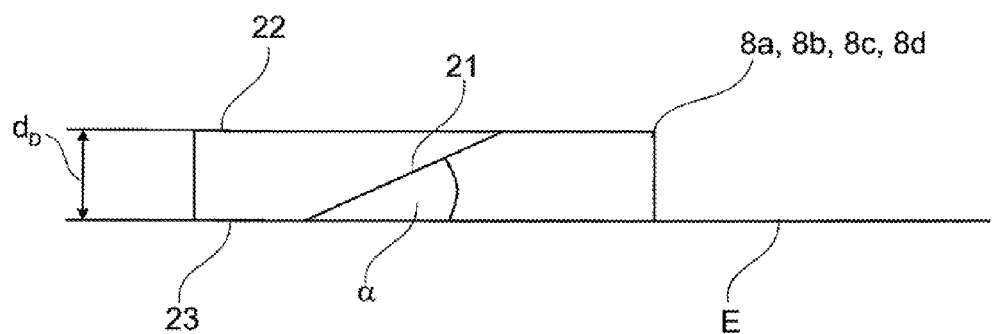
FIG. 3: is a side view of the sealing ring according to FIG. 2.

A sealing ring 8a, 8b, 8c, 8d of a seal arrangement 1 according to the invention is shown in a top view in FIG. 2 and in a side view in FIG. 3. A sealing ring 8a, 8b, 8c, 8d has an essentially annular three-dimensional shape with a preferably rectangular cross-section QS. The sealing ring 8a, 8b, 8c, 8d has a butt joint 21 so that the sealing ring 8a, 8b, 8c, 8d is able to expand slightly in the radial direction 3b and can thus fit snugly in a prestressed fashion against a piston rod 105, which has a slightly larger outer diameter than the relaxed inner diameter $D_i$ of the sealing ring.

This causes the butt joint 21 to expand slightly. Through the exertion of axial forces, the two parts of the butt joint 21, which is embodied in the form of a bevel cut (see FIG. 3), can be brought back into sealed contact with each other during operation. The butt joint 21 is preferably embodied by means of a laser cut; the laser cut is oriented at an angle α relative to the plane E of the sealing ring 8a, 8b, 8c, 8d. The angle α preferably lies a range between 10° and 45°, in particular in a range between 10° and 30°.

In the existing sizes of conventional reciprocating piston machines and the resulting sizes of sealing rings 8a, 8b, 8c, 8d, it has proven suitable to embody the butt joint 21 as a laser cut since this makes it possible to produce a particularly narrow width of cut.

The diameter $D_i$ in conventional high-speed reciprocating piston machines is approximately 15 mm to 30 mm. A thickness $d_D$ of the sealing rings 8a, 8b, 8c, 8d lies in a range from 1 mm to 1.8 mm, particularly preferably in a range from 0.85 mm to 1.8 mm, ideally in a range from 0.95 mm to 1.3 mm In addition, each sealing ring 8a, 8b, 8c, 8d has a first end surface 22 and a second end surface 23 by means of which each sealing ring comes into contact with and rests against either the housing bottom 6 or a spacer ring 9a, 9b, 9c or a housing cover 5.

Figure 4:
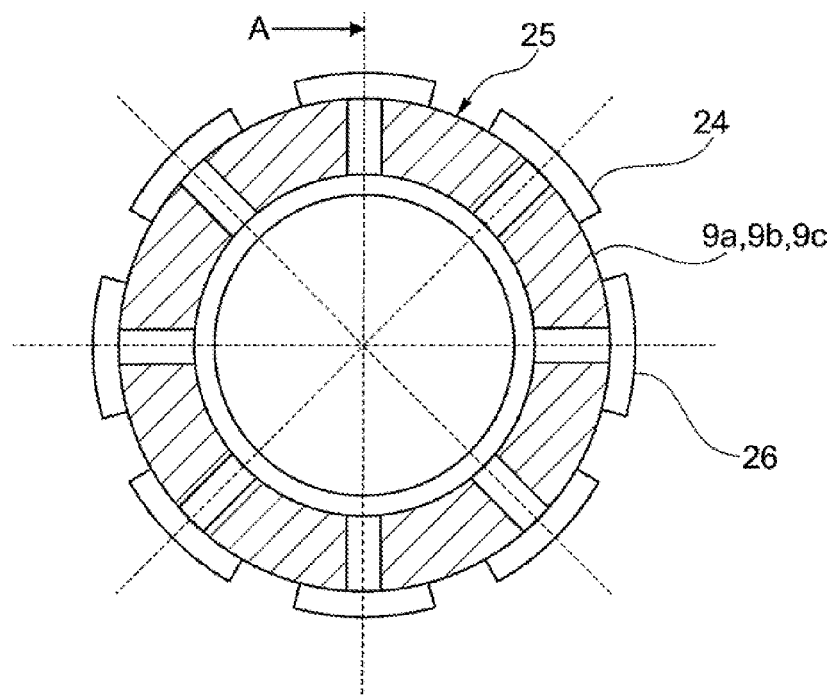
FIG. 4: is a top view of a first embodiment of a spacer ring according to the invention.
Figure 5:
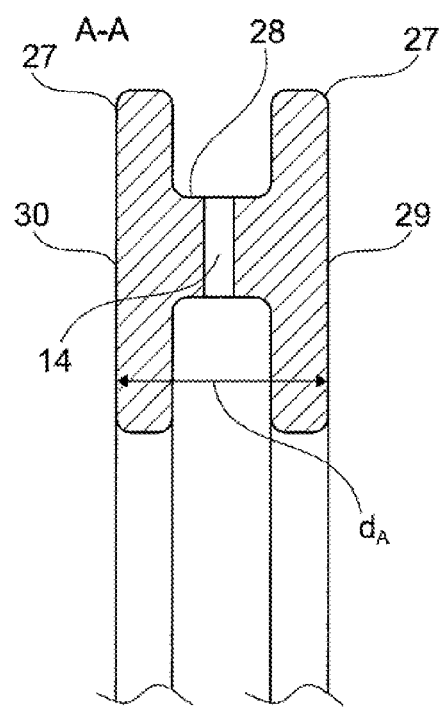
FIG. 5: is a cross-sectional depiction of the spacer ring according to FIG. 4 along the line A-A.

By way of an exemplary embodiment, FIGS. 4 and 5 show the embodiment of a spacer element, in particular a spacer ring 9a, 9b, 9c. A top view of such a spacer ring 9a, 9b, 9c is shown in FIG. 4. It is clear that the outer edge of the spacer rings 9a, 9b, 9c has crenellated projections 24 distributed over its circumference, which respectively enclose gaps 25 between themselves. With an outer circumference edge 26, which is the outermost radial limit edge of the projections 24, the spacer rings 9a, 9b, 9c rest without play or virtually without play in the first seal housing part 4, possibly in a way that allows them to rotate around the longitudinal axis.

On their radial inside, the spacer rings 9a, 9b, 9c have a diameter that is chosen to be significantly larger than the outer diameter of the piston rod 105 so that contact between the spacer rings 9a, 9b, 9c and the piston rod 105 cannot occur.

In cross-section (FIG. 5), the spacer rings 9a, 9b, 9c have an H-shaped three-dimensional shape with vertical struts 27 and a horizontal crosspiece 28. As described above, the passage 14 makes it possible for medium (e.g. oil) to drain outward from the retention chambers 10a, 10b, 10c via the passage 14.

Alternatively to this, the spacer rings 9a, 9b, 9c can also have a cross-sectionally rectangular three-dimensional shape (not shown). In order to provide the passages 14, on these spacer rings are equipped with channel-like recesses extending radially outward, for example grooves or semicircular flutes or the like the outer flat sides 29 and 30, which in the installed state, come into contact with the sealing rings 8a, 8b, 8c, 8d. In such an embodiment of the spacer ring, these grooves or flutes then constitute the passages 14 for the possible emptying of the retention chambers 10a, 10b, 10c.

Figure 6:
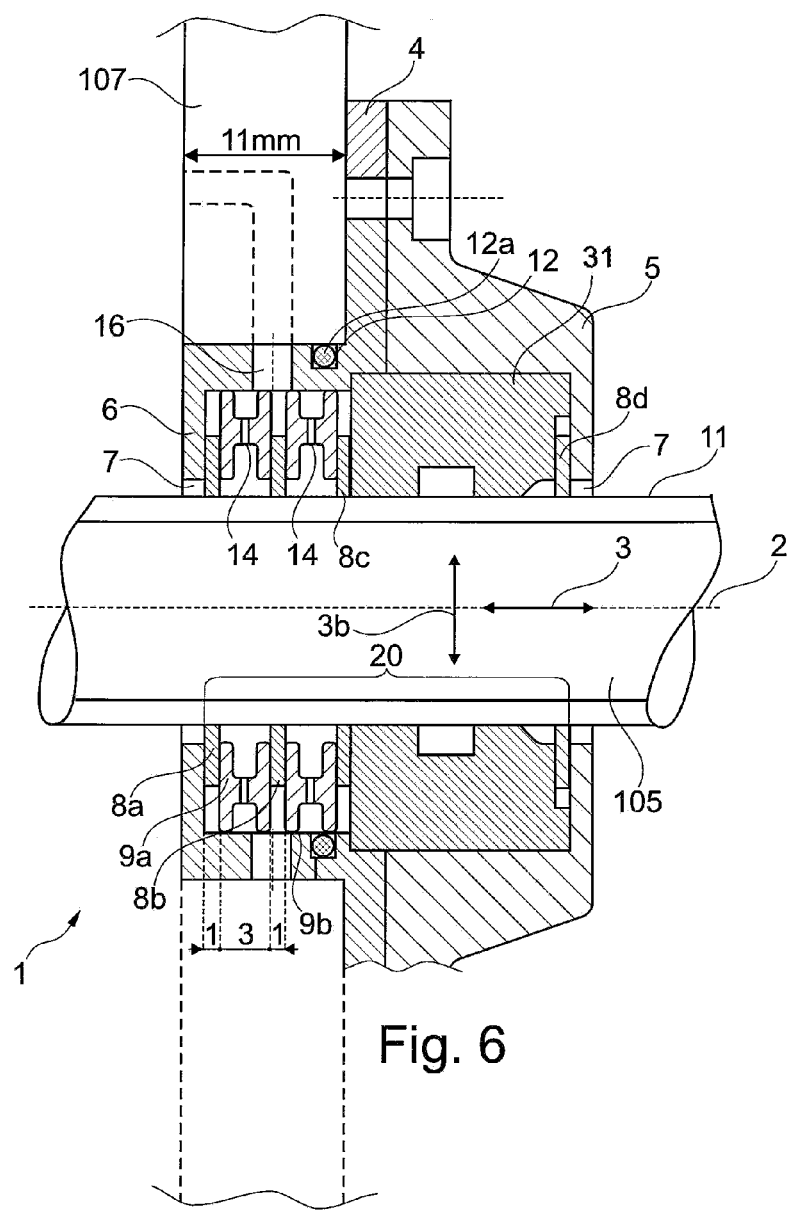
FIG. 6: is a cross-sectional depiction of a second embodiment of the device according to the invention.

In another embodiment of the seal arrangement according to the invention shown in FIG. 6, one of the spacer rings—in the exemplary embodiment, the spacer ring 9c that is situated the closest to the piston side—is replaced by a radial bearing bush 31. The radial bearing bush 31 is situated in the axial direction between two sealing rings 8c and 8d and thus replaces the spacer ring 9c.

By contrast with the spacer elements 9a, 9b, 9c, the radial bearing bush 31 rests in the radial direction against the outer surface 11 of the piston rod 105 and/or guides the latter so that it is supported in the radial direction 3b, possibly with a slight amount of play.

Preferably, the axial longitudinal span of a radial bearing bush 31 in the direction of the double arrow 3 is greater than the axial span of a spacer ring 9c, as a result of which the housing cover 5 in the exemplary embodiment is correspondingly adapted so that the entire arrangement—which in the exemplary embodiment according to FIG. 6 is composed of four sealing rings, two spacer rings, and one radial bearing bush—is once again supported without play or virtually without play, possibly also in a prestressed fashion, in the seal housing 4, 5.

In the seal arrangement 1 according to the invention, it is particularly advantageous that a series of several seal packets 20, each composed of two sealing rings and one spacer ring—where a spacer ring can be associated with two adjacent seal packets 20, can be used in a particularly advantageous way to achieve a small overall size with improved sealing properties. Especially in high-speed reciprocating piston machines that are operated as gasoline engines, it is particularly important that no oil from the crankcase escapes into the space underneath the piston bottom and can thus get into the combustion chamber due to the rinsing action inherent in the two-stroke principle.

A highly effective sealing of this kind between the crankcase and the cylinder chamber underneath the piston bottom can be achieved with a seal arrangement according to the invention. It successfully achieves this even though the seal arrangement is exposed to powerful, pulsating pressures of the kind that occur, for example, when the chamber underneath the piston bottom (between the piston bottom and partition wall) is used as a charging pump for the internal combustion engine.

One particular advantage of the invention is that such a partition wall seal arrangement according to the invention can be preassembled in modular fashion with the two housing parts 4 and 5 and slid as a single module onto a piston rod of an internal combustion engine or reciprocating piston machine. The individual parts of the seal do not have to be assembled inside the reciprocating piston machine. A modular design of this kind, which is extremely compact, is a particular advantage of the present invention.

It has surprisingly also turned out that the sealing action of the internally clamping sealing rings is good enough that in three-dimensional terms, only very small retention chambers 10a through 10c are required for temporarily storing stripped-off oil before it is drained via the outer chamber and a drainage unit, e.g. a suction pump. This knowledge also contributes to the fact that the seal arrangement according to the invention has a high degree of effectiveness with regard to its sealing action, with a small overall size.

In particular, the invention relates to a seal arrangement for high-speed reciprocating piston machines, e.g. compressors or small internal combustion engines, and in this regard, is not comparable to the rod glands already known from the prior art, which are used chiefly for low-speed engines such as marine diesel engines.

Such rod glands are unsuitable for small internal combustion engines of the type mentioned above since the overall height of the rod glands in the axial direction is much too large and they cannot be accommodated in a high speed, small internal combustion engine.

Such rod glands are chiefly known and conventionally used, as mentioned above, for low-speed internal combustion engines such as crosshead engines and the like.

By contrast, the invention can easily be used in high-speed internal combustion engines at speeds of up to 1500 to 8000 RPM. This rotational frequency/rotation speed also corresponds to the number of oscillating reciprocating actions with which the piston rod 105 travels through the seal arrangement 1. In the context of the invention, high-speed internal combustion engines are engines whose nominal speed is greater than 1500 to 2000 RPM. Such engines can have displacements of between a few hundred $cm^3$ to 4 or 5 liters and in individual cases, can be even larger.

Furthermore, it has turned out that by contrast with the known rod glands for low-speed engines, a seal arrangement according to the invention can be used in a maintenance-free or virtually maintenance-free fashion.

The invention claimed is:

1. An arrangement for sealing a piston rod of a reciprocating piston machine, which reciprocates essentially in a straight line relative to a through opening, comprising:
   at least two internally clamping sealing rings, which are situated in a region of the through opening and are essentially stationary relative to a seal housing, and are supported in the seal housing such that the at least two sealing rings are able to move in a floating fashion;
   a spacer ring provided between at least two sealing rings, wherein the spacer ring is externally guided without play or with a slight amount of play in the seal housing and on a radial inside oriented toward the piston rod, the spacer ring has a greater amount of play in the radial direction; and
   a retention chamber formed by the spacer ring, the sealing rings and the piston rod, for sealing a medium, therein;
   wherein the spacer ring does not touch the piston rod, and the spacer ring is spaced apart from the piston rod; and
   wherein the spacer ring has at least one passage for drainage of the medium from the retention chamber, and each spacer ring has a crenellated contour along its outer circumference in a circumferential direction.

2. The arrangement as recited in claim 1, wherein the seal housing has a conduit for draining medium that has come out of the retention chamber.

3. The arrangement as recited in claim 2, wherein the conduit for draining medium comprises a suction pump that is connected to the seal housing via corresponding suction lines.

4. The arrangement as recited in claim 1, wherein at least two sealing rings and at least one spacer ring form a seal packet, which is supported in the seal housing without play or virtually without play in an axial direction, which is in a movement direction of the piston rod so as to permit a radially floating movement of the sealing rings during operation.

5. The arrangement as recited in claim 4, wherein a total axial play of the seal packet in the seal housing is approximately 0.05 mm to 0.15 mm.

6. The arrangement as recited in claim 4, wherein the seal packet is supported without play in the seal housing in an axially prestressed fashion, which is prestressed by an axially acting lock washer.

7. The arrangement as recited in claim 6, wherein the prestressing of the seal packet is selected so that the selection permits a radially floating movement of the sealing rings during operation.

8. The arrangement as recited in claim 1, wherein the sealing rings are approximately rectangular in cross-section and are embodied of one piece, with a single butt joint.

9. The arrangement as recited in claim 8, wherein the bin joint is a bevel cut through the sealing ring.

10. The arrangement as recited in claim 9, wherein the bevel cut is inclined at an angle of 10° to 45° relative to the plane of the sealing ring in order to achieve a large overlap region.

11. The arrangement as recited in claim 9, wherein the bevel cut is embodied in the form of a laser cut.

12. The arrangement as recited in claim 1, wherein the sealing rings (8a, 8b, 8c, 8d) have a thickness $d_D$ of 1 mm to 1.8 mm.

13. The arrangement as recited in claim 1, wherein the spacer rings have an essentially H-shaped cross-section whose vertical struts oriented toward the outside of the sealing rings are embodied to rest against axial end surfaces of the sealing rings.

14. The arrangement as recited in claim 13, wherein a crosspiece of the essentially H-shaped cross-section has passages, in particular bores, which extend in the radial direction.

15. The arrangement as recited in claim 14, wherein a plurality of radially extending bores are provided, which are distributed over the circumference.

16. The arrangement as recited in claim 1, wherein the spacer rings are embodied as rectangular in cross-section and on their end surfaces, have conduits in the form of grooves or otherwise channel like recesses extending outward in an essentially radial direction.

17. The arrangement as recited in claim 1, wherein the spacer rings have a thickness $d_A$ of approximately 2.5 mm to 4 mm.

18. The arrangement as recited in claim 1, wherein instead of or in addition to additional spacer rings, a bearing bush can be inserted between two additional sealing rings, which provides the radial support of the piston rod in the region of the through opening.

19. The arrangement as recited in claim 1, wherein the seal housing can be closed with a seal housing cover so that an arrangement for sealing a piston rod that reciprocates in a straight line can be installed in modular fashion as a seal packet on a partition wall of a reciprocating piston machine.

20. The arrangement as recited in claim 1, wherein an inner diameter $D_i$ of the sealing ring in a relaxed state is smaller than the outer diameter of the piston rod by approximately 0.01 mm to 0.05 mm.

21. A reciprocating piston machine, comprising a crank mechanism embodied in the form of a Scotch yoke with at least one piston rod, which reciprocates in essentially linear fashion and in a straight line, and having a partition wall for separating a crankcase from a cylinder chamber situated between the partition wall and a piston bottom, equipped with a seal arrangement as recited in claim 1.

22. The reciprocating piston machine as recited in claim 21, wherein the reciprocating piston machine is an internal combustion engine.

23. The reciprocating piston machine as recited in claim 22, wherein the internal combustion engine operates in accordance with a two-stroke principle.

24. The reciprocating piston machine as recited in claim 21, wherein the reciprocating piston machine is a gasoline engine.

25. The reciprocating piston machine as recited in claim 21, wherein the reciprocating piston machine is an externally driven subassembly.

* * * * *